United States Patent [19]

Oliver

[11] 4,266,813
[45] May 12, 1981

[54] UNIVERSAL COUPLER

[76] Inventor: Robert D. Oliver, 2512 Doris, Brighton, Mich. 48116

[21] Appl. No.: 91,728

[22] Filed: Nov. 6, 1979

[51] Int. Cl.³ .................................... F16L 55/00
[52] U.S. Cl. .................................... 285/12; 285/175; 285/177; 285/390; 285/423; 285/DIG. 22
[58] Field of Search ............... 285/177, 175, 176, 12, 285/423, DIG. 22; 215/100 R, 228, 319; 222/568, 562; 141/364–367; 220/87

[56] References Cited

U.S. PATENT DOCUMENTS

| 1,644,582 | 9/1928 | Hoaglund | 285/177 X |
|---|---|---|---|
| 1,647,245 | 11/1927 | Morrill | 222/181 |
| 2,117,955 | 5/1938 | Haas | 285/177 |
| 2,456,418 | 12/1948 | Imerman | 285/177 |
| 2,562,294 | 7/1951 | Cahenzli | 285/177 |
| 2,768,844 | 10/1956 | Schadeberg | 285/177 |
| 2,956,737 | 10/1960 | Hager | 141/367 X |
| 2,978,262 | 4/1961 | Frank | 285/423 X |
| 3,473,782 | 10/1969 | Gessic | 251/149.6 |
| 3,690,703 | 9/1972 | Phillipps | 285/177 |
| 4,067,072 | 1/1978 | Izzi | 285/12 X |
| 4,116,477 | 9/1978 | Wahoski | 285/169 |
| 4,187,846 | 2/1980 | Lolachi | 285/423 |

FOREIGN PATENT DOCUMENTS

| 262301 | 5/1960 | Australia | 222/568 |
|---|---|---|---|
| 2027261 | 12/1970 | Fed. Rep. of Germany | 285/177 |
| 2510257 | 9/1976 | Fed. Rep. of Germany | 222/562 |

Primary Examiner—Dave W. Arola
Attorney, Agent, or Firm—James M. Deimen

[57] ABSTRACT

The invention comprises a funnel shaped device adapted to selectably engage male or female standard garden hose fittings, antifreeze bottles and "Clorox" brand sodium hypochlorite bottles. The coupler enables the fresh water holding tanks of a recreational vehicle or yacht to be flushed conveniently, disinfected with sodium hypochlorite or filled with antifreeze for winter storage.

6 Claims, 6 Drawing Figures

UNIVERSAL COUPLER

BACKGROUND OF THE INVENTION

The field of the invention pertains to hose fittings, funnels for attachment to bottles and to standard garden hose attachments.

The prior art consists of a variety of coupling devices for hoses and pipes. Representative of devices for coupling different diameter hoses together are those disclosed in U.S. Pat. Nos. 2,768,844 and 3,690,703. Similarly, devices for coupling tubing or tubing and threaded pipe are disclosed in U.S. Pat. Nos. 2,562,294, 3,473,782 and 4,116,477. Such coupling devices are expensive, complicated configurations for high pressure fluids and may incorporate valve means as shown.

Simple clamping devices for coupling tubing are shown in U.S. Pat. No. 2,117,955. A soap dispensing device that couples a reservoir to a support and a tubular spout is disclosed in U.S. Pat. No. 1,647,245. None of the above devices, however, are directed toward selectable attachment to standard garden hoses or bottles with differing thread diameters and thread pitches.

SUMMARY OF THE INVENTION

The invention comprises a funnel shaped device adapted to selectably engage male or female standard garden hose fittings, antifreeze bottles and "Clorox" brand sodium hypochlorite bottles. A short detachable and flexible tube is included with the coupler for insertion into the fresh water fill pipe of a recreational vehicle or yacht. The respective thread diameters and neck sizes of the antifreeze and sodium hypochlorite bottles and the male hose fittings permit a step wise threaded funnel shape for the coupler. Each may be selectably threaded into the coupler. Either the flexible tube or the female end of a garden hose may be attached to the other end of the coupler enabling the contents of the bottle to be conveniently poured into the fill pipe of the recreational vehicle. Alternatively, the male end of a garden hose may be inserted into the coupler and the flexible tube inserted into the fresh water fill pipe of the recreational vehicle to provide a convenient means for flushing the fresh water system of the recreational vehicle or yacht.

DESCRIPTION OF THE PREFERRED EMBODIMENT

Figure 1:
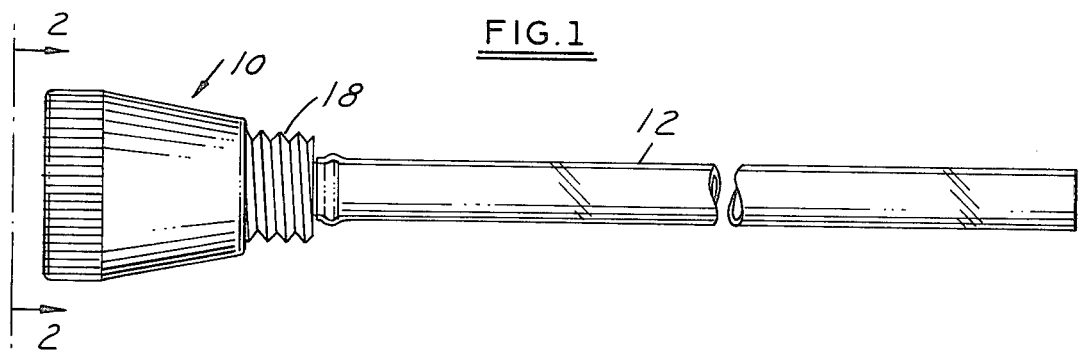
FIG. 1 is a side view of the coupler and tubing attached thereto.
Figure 3:
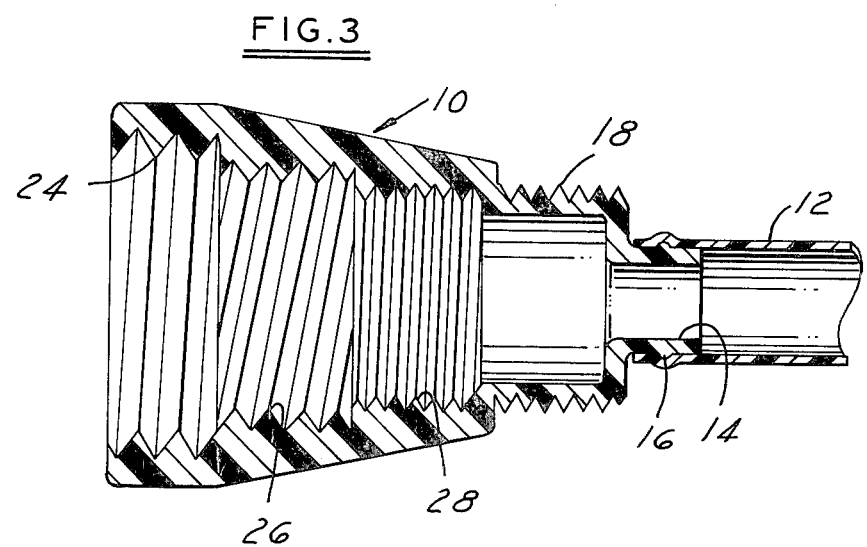
FIG. 3 is a partial cutaway view of the coupler taken along the line 3—3 in FIG. 2.
Figure 2:
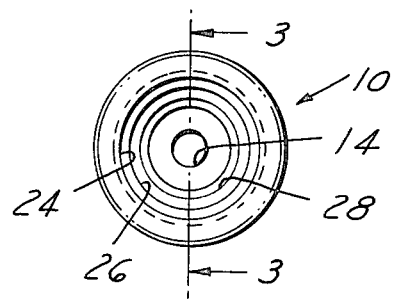
FIG. 2 is an end view of the coupler as seen in the direction of the arrows 2—2 in FIG. 1.
Figure 6:
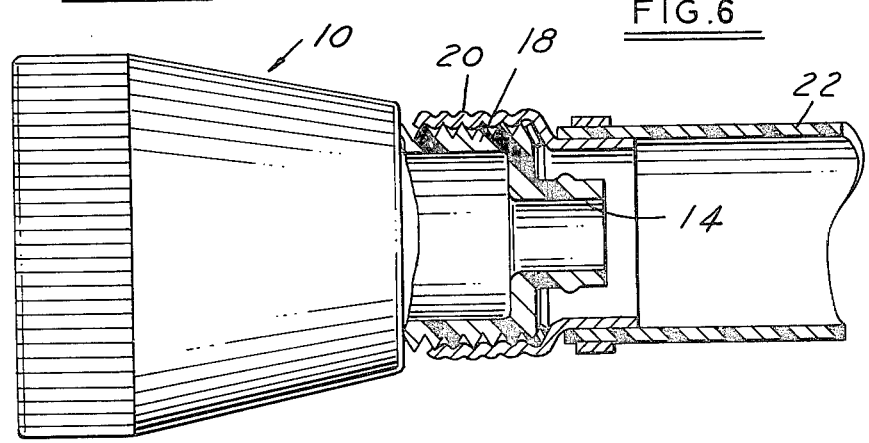

In FIGS. 1, 2 and 3 the coupler is shown comprising a generally funnel shaped body 10 having attached thereto a long flexible tube 12. As best shown in FIG. 3 the body 10 includes a minimum diameter portion 14 which fits inside the end of the tube 12. An annular ridge 16 is formed on the portion 14 to provide a tight snap fit with the tube 12. The tube 12 may be made of a deformable and flexible plastic such as polyethylene or polypropylene. The coupler body 10 may be of the same plastic or a more rigid material. Adjacent the minimum diameter portion 14 is a male threaded portion 18 sized to accept a female hose fitting 20 and hose 22 as best shown in FIG. 6. Thus the tube 12 may be disconnected and a garden hose attached as shown.

Figure 5:
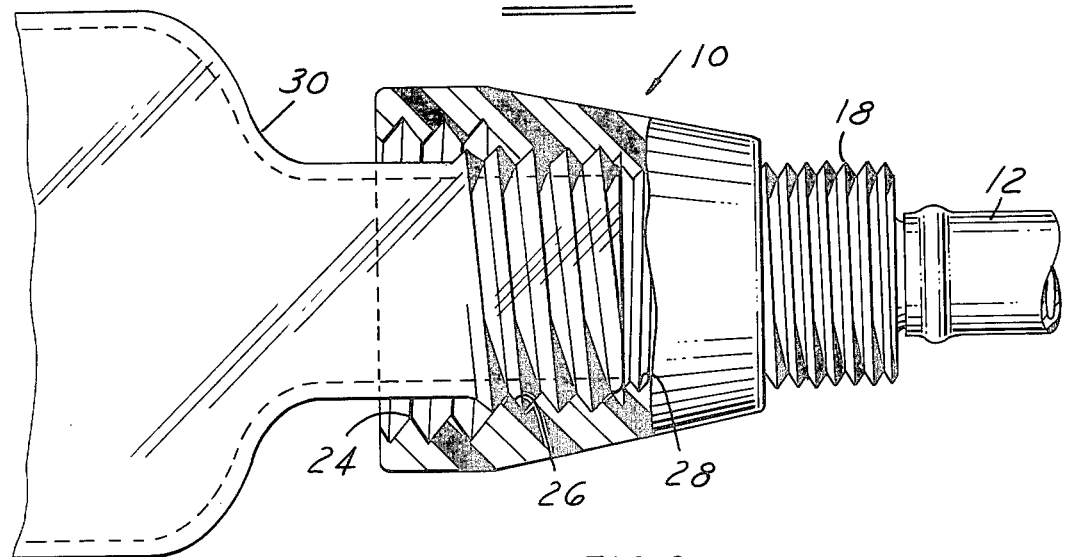
FIG. 5 is a partial cutaway view of a "Clorox" brand sodium hypochlorite bottle attached to the coupler; and, FIG. 6 is a partial cutaway view of a hose attached to the male portion of the coupler.

Returning to FIG. 3 the main portion of the body 10 has three internal threads 24, 26 and 28 of decreasing diameter. The thread pitches and diameters are determined by the particular thread pitches and diameters of the bottles used. In the preferred embodiment the smallest diameter thread 28 is sized to accept a standard male garden hose fitting. The threads 26 and 24 are of sufficient diameter to permit the hose and male fitting to fit therewithin. The thread diameter and pitch of thread 26 are sized to fit a "Clorox" brand bottle 30 of sodium hypochlorite as shown in FIG. 5 and which is typically used to clean and purify recreational and yacht fresh water tanks and piping. On some vehicles the fresh water fill pipe has little or no downward slope. With the tube 12 inserted in the fill pipe and the bottle attached to the coupler the sodium hypochlorite can be easily poured into the tank without spillage. The tank can be flushed easily with the garden hose attached to thread 28 subsequent to or prior to disinfecting.

Figure 4:
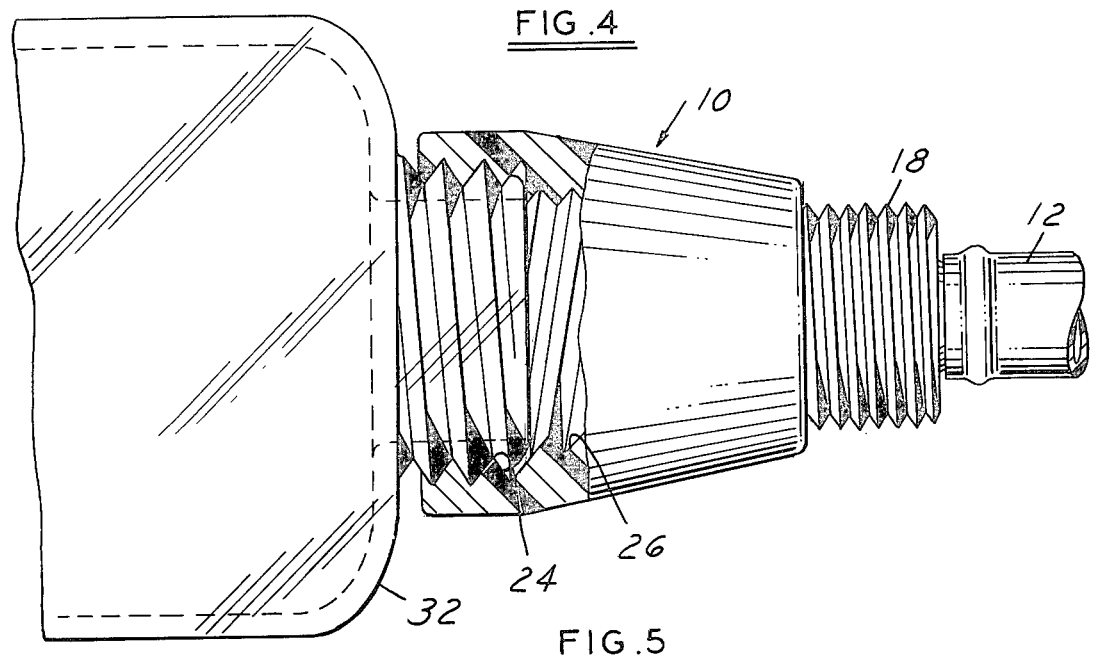
FIG. 4 is a partial cutaway view of an antifreeze bottle attached to the coupler.

In freezing climates a special antifreeze, safe for fresh water systems, is put in the tank and piping during storage of the recreational vehicle or yacht. Thread 24 is sized to accept the antifreeze bottle 32 as shown in FIG. 4. In a similar manner the tube 12 is inserted in the fill pipe of a recreational vehicle and the antifreeze conveniently poured into the tank.

On some recreational vehicles and yachts it may be more convenient to use a hose in substitution for the tube 12. The male thread 18 is provided for the hose fitting 20 and hose 22. The antifreeze or sodium hypochlorite can be conveniently poured through the hose 22 and into the fresh water tank with the coupler and hose.

I claim:

1. A coupling device comprising a body, a generally conical hole through the body, a plurality of internal threaded portions formed in the hole extending from the large end of the hole and of stepwise sequentially decreasing diameter, snap fit attachment means on the body adjacent the small end of the hole and an external threaded portion on the body adjacent the snap fit attachment means.

2. The coupling device of claim 1 including a tube adapted to attach to the snap fit attachment means.

3. The coupling device of claim 1 wherein the plurality of internal threaded portions are of differing thread pitches.

4. The coupling device of claim 1 wherein the external threaded portion is adapted to fit a standard female garden hose fitting.

5. The coupling device of claim 1 wherein at least one of the internal threaded portions is adapted to fit a standard male garden hose fitting.

6. The coupling device of claim 5 wherein the internal threaded portion next adjacent the internal threaded portion adapted to fit a standard male garden hose fitting is of sufficient diameter to permit a standard male garden hose fitting to pass therethrough.

* * * * *